United States Patent
Tong et al.

(10) Patent No.: US 11,322,847 B2
(45) Date of Patent: May 3, 2022

(54) PATCH ANTENNA

(71) Applicant: NXP B.V., Eindhoven (NL)

(72) Inventors: Ziqiang Tong, Ottobrunn (DE); Ralf Reuter, Landshut (DE); Arnaud Sion, Munich (DE)

(73) Assignee: NXP B.V., Eindhoven (NL)

( * ) Notice: Subject to any disclaimer, the term of this patent is extended or adjusted under 35 U.S.C. 154(b) by 130 days.

(21) Appl. No.: 15/849,753

(22) Filed: Dec. 21, 2017

(65) Prior Publication Data

US 2018/0198210 A1 Jul. 12, 2018

(30) Foreign Application Priority Data

Dec. 30, 2016 (EP) .................................... 16207490

(51) Int. Cl.
| | |
|---|---|
| *H01Q 1/38* | (2006.01) |
| *H01Q 9/04* | (2006.01) |
| *H01Q 13/10* | (2006.01) |
| *H01Q 5/371* | (2015.01) |
| *H01Q 5/364* | (2015.01) |
| *H01Q 5/357* | (2015.01) |
| *H01Q 1/32* | (2006.01) |
| *H01Q 1/27* | (2006.01) |
| *G01S 13/931* | (2020.01) |

(52) U.S. Cl.
CPC .............. *H01Q 9/0421* (2013.01); *H01Q 1/27* (2013.01); *H01Q 1/3233* (2013.01); *H01Q 5/357* (2015.01); *H01Q 5/364* (2015.01); *H01Q 5/371* (2015.01); *H01Q 9/0407* (2013.01); *H01Q 9/0442* (2013.01); *H01Q 13/106* (2013.01); *G01S 13/931* (2013.01)

(58) Field of Classification Search
CPC .......... H01Q 1/48; H01Q 9/0421; H01Q 7/06; H01Q 1/12; H01Q 1/2283; H01Q 7/08
See application file for complete search history.

(56) References Cited

U.S. PATENT DOCUMENTS

| | | | |
|---|---|---|---|
| 3,403,394 A | | 9/1968 | Rouault |
| 6,774,853 B2 * | | 8/2004 | Wong ..................... H01Q 1/243 |
| | | | 343/700 MS |
| 2008/0316121 A1 * | | 12/2008 | Hobson .................. H01Q 1/243 |
| | | | 343/702 |

(Continued)

FOREIGN PATENT DOCUMENTS

EP 1 276 170 A1 1/2003

OTHER PUBLICATIONS

Shafiei et al., Antenna Tackles Wi-Fi and WiMAX, Microwaves & RF; Jan. 2015, vol. 4 Issue 1, p. 80-83 (Year: 2015).*

(Continued)

*Primary Examiner* — Dieu Hien T Duong

(57) ABSTRACT

The disclosure relates to patch antennas for radar or communications applications. Example embodiments include an antenna comprising: a substrate; a ground plane on a first face of the substrate; and a patch antenna on an opposing second face of the substrate, the patch antenna having a lead extending along a central axis and connected to a rectangular radiating element, wherein the rectangular radiating element comprises two slots on opposing sides of the central axis such that the patch antenna has two resonant frequencies within an operating frequency range of the antenna.

20 Claims, 10 Drawing Sheets

(56) References Cited

U.S. PATENT DOCUMENTS

2013/0162491 A1 6/2013 Yu
2016/0079676 A1 3/2016 Chuang et al.
2017/0309997 A1* 10/2017 Alland .............. H04L 27/26265
2018/0141545 A1* 5/2018 Freytag .............. B60W 30/095

OTHER PUBLICATIONS

Bhadouria et al, "Microstrip X-band Antenna with Improvement in Performance Using DGS", Electrical and Electronic Engineering 2014, pp. 31-35 (Year: 2014).*

Mohammad, "Small Square Monopole Antenna With Inverted T-Shaped Notch in the Ground Plane for UWB Application", IEEE Antennas and Wireless Propagation Letters, vol. 8, 2009, pp. 728-731 (Year: 2009).*

Amadjikpe, A. L. et al. "Integrated 60-GHz Antenna on Multilayer Organic Package With Broadside and End-Fire Radiation", IEEE Transactions on Microwave Theory and Techniques, vol. 61, No. 1, pp. 303-315 (Jan. 2013).

Cao, W. "Microstrip antenna with radiation pattern selectivity and polarized diversity based on modified metamaterial structure", International Conference on Microwave and Millimeter Wave Technology, Shenzhen, pp. 1-4 (2012).

Tzou, W.-C. et al. "Bandwidth Enhancement of U-Slot Patch Antenna on High Permittivity Ceramic Substrate for Bluetooth Application", Microwave and Optical Technology Letters vol. 36, No. 6, Dept. of Electrical Engineering National Sun Yat-Sen Uni., pp. 499-501 (Mar. 20, 2003).

Bhadouria, A. S. et al. "Microstrip X-band Antenna with Improvement in Performance Using DGS", Electrical and Electronic Engineering, pp. 31-35 (2014).

Shafiei, M. M. et al. "Antenna Tackles", Microwaves & RF, pp. 80-83 (Jan. 2015).

Alsaleh, A. A. A. et al. "Design and Optimization of Dual Band Microstip Patch Antenna Using Slots Pair", 2016 International Conference on Computer & Communication Engineering, pp. 439-442 (2016).

Abbasi Layegh, M.; Ghobadi, C.; Nourinia, J. The Optimization Design of a Novel Slotted Microstrip Patch Antenna with Multi-Bands Using Adaptive Network-Based Fuzzy Inference System Technologies 5, 75 (Nov. 2017), 12 pgs.

Kozak, R., Khorsand, K., Zarifi, T. et al. Patch antenna sensor for wireless ice and frost detection. Sci Rep 11, 13707 (2021), 11 pgs.

Behera, S.K. & Choukiker, Yogesh. Design and Optimization of Dual Band Microstrip Antenna Using Particle Swarm Optimization Technique. Journal of Infrared, Millimeter, and Terahertz Waves 31. 1346-1354 (Sep. 2010).

Yang, Fan & Zhang, Xue-Xia & Ye, Xiaoning & Rahmat-Samii, Yahya. Wideband E-shaped Patch Antenna for Wireless Communications Antennas and Propagation, IEEE Transactions on. 49. 1094-1100 (Jul. 2001).

M. Sanad. Comments on "Wide-band E-shaped patch antennas for wireless communications", in IEEE Transactions on Antennas and Propagation, vol. 51, No. 9, p. 2541 (Sep. 2003).

* cited by examiner

PATCH ANTENNA

CROSS-REFERENCE TO RELATED APPLICATIONS

This application claims the priority under 35 U.S.C. § 119 of European Patent application no. 16207490.0, filed on 30 Dec. 30, 2016, the contents of which are incorporated by reference herein.

FIELD

The disclosure relates to patch antennas for radar or communications applications.

BACKGROUND

A conventional patch antenna 100 is illustrated in FIG. 1, the antenna 100 having a planar antenna structure 101 mounted on a planar substrate 102, with a ground plane (not shown) provided on the other side of the substrate 102. A microstrip transmission line 103 extends along an axis 104 and connects to a rectangular patch 105 extending on either side of the axis 104. The lateral dimensions of the rectangular patch 105, i.e. the length L and width W, along with the thickness and dielectric constant of the substrate 102, define the resonant frequency of the antenna 100, while the difference between the length and width defines the shape of the radiation pattern of the antenna 100, a smaller difference providing a more uniform pattern.

Typical applications for patch antennas are in the field of radar sensing, which is increasingly being used in automotive applications. Frequencies of the order of tens of GHz are typically used, resulting in antenna lateral dimensions of the order of millimetres in size. An antenna will be designed for a particular resonant frequency and radiation pattern. Different radiation patterns, which may for example be required for narrow and wide field radar sensing, will require different antennas.

SUMMARY

In accordance with a first aspect of the present disclosure there is provided an antenna comprising:
a substrate;
a ground plane on a first face of the substrate; and
a patch antenna on an opposing second face of the substrate, the patch antenna having a lead extending along a central axis and connected to a rectangular radiating element,
wherein the rectangular radiating element comprises two slots on opposing sides of the central axis such that the patch antenna has two resonant frequencies within an operating frequency range of the antenna.

An advantage of the antenna is that the two resonant frequencies within a frequency range of operation can be used to provide different modes of operation using the same antenna. Different radiation patterns in each mode can, for example, be used to provide narrow and wide fields of view by simply switching the frequency of operation. For radar applications, the field of view of a radar system can be increased without the need for additional hardware, since a common antenna can be used for different fields of view. For communication applications, the ability to switch between different fields of view may be advantageous when a pair of antennas are oriented such that they are not in line but are oriented at an angle with respect to each other. Switching to a different beam pattern may therefore potentially increase the gain for the communication chain.

The two resonant frequencies may be within a frequency range of 60 to 90 GHz, typically used for radar applications, and may be within a range of 75 to 110 GHz (known as the W band), or more narrowly between 77 and 81 GHz (known as the 79 GHz band, and currently the subject of development for automotive radar applications).

A higher one of the two resonant frequencies may be less than 5% greater than a lower one of the two resonant frequencies. In certain embodiments, a ratio between the higher and lower resonant frequencies may be between 1.01 and 1.05, with a particular value of around 1.02. In general, a percentage difference between the resonant frequencies will be greater at lower frequencies.

The two slots may be oriented parallel to the central axis of the patch antenna. Each of the two slots may be positioned between 5% and 20% of a width of the rectangular radiating element from an edge thereof, where the width of the rectangular element is the linear dimension orthogonal to the central axis and in the plane of the substrate. A length of each of the two slots may be between 0.6 and 0.9 of a length of the rectangular radiating element, where the length of the rectangular radiating element is the linear dimension parallel to the central axis and in the plane of the substrate. A width of each of the two slots may be between 0.05 and 0.3 mm.

In accordance with a second aspect there is provided a radar or RF communication transceiver comprising an antenna according to the first aspect.

In accordance with a third aspect there is provided a method of operating a radar transceiver of the second aspect, the method comprising:
in a first operation, operating the transceiver at a first resonant frequency of the antenna to detect objects within a first field of view;
in a second operation, operating the transceiver at a second resonant frequency of the antenna to detect objects within a second field of view; and
combining results from the first and second operations.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
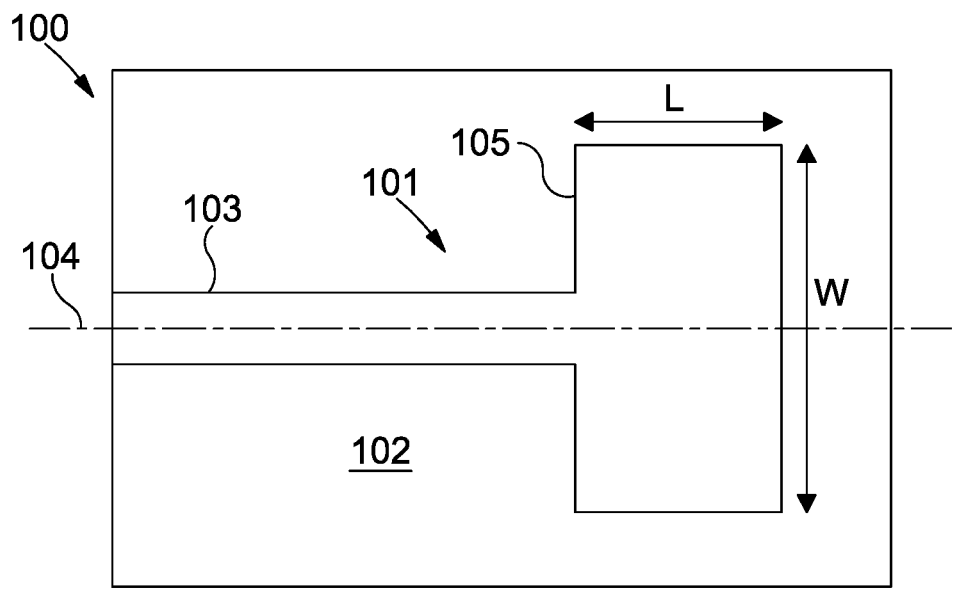
FIG. 1 is a schematic plan view of an example patch antenna.

It should be noted that the figures are diagrammatic and not drawn to scale. Relative dimensions and proportions of parts may be shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 2:
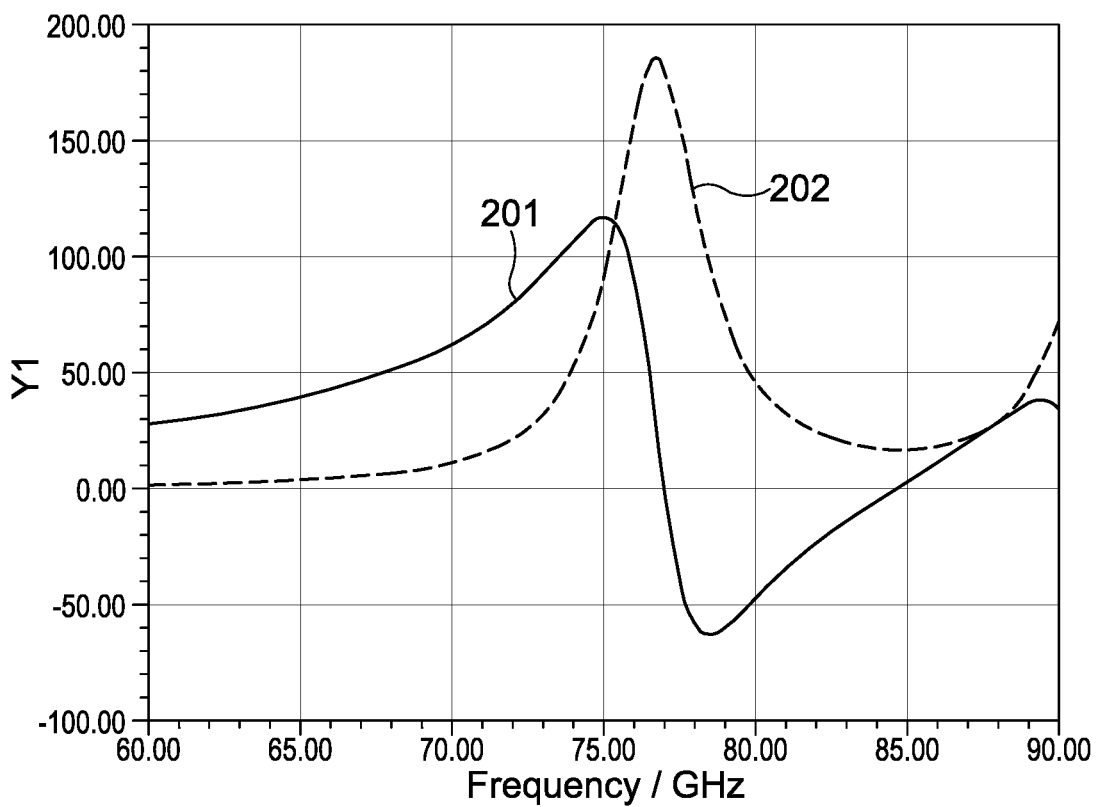
FIG. 2 is a plot of the real and imaginary parts of the antenna impedance as a function of frequency for a patch antenna of the type illustrated in FIG. 1.

FIG. 2 illustrates a plot of the real 201 and imaginary 202 parts of the port impedance as a function of frequency for a typical patch antenna of the type illustrated in FIG. 1. The resonant frequency of around 77 GHz is typical for use in automotive radar sensing applications, for example as used in the Qorivva MPC577xK MCU and the MR2001 77 GHz radar transceiver chipsets available from NXP USA Inc. (previously Freescale Semiconductor, Inc.). Within the frequency range of operation, the antenna is operable only at or near the single resonant frequency.

Typical dimensions of an antenna of the type shown in FIG. 2 are of the order of half the wavelength of the frequency of operation. For example, the length L of the patch antenna 105 may be around 1 to 2 mm for operating frequencies within the range of 75 to 150 GHz. In a particular example, the dimensions of the patch antenna may be L=1.035 mm and W=1.5 mm, making the resonant frequency around 77 GHz, as shown in FIG. 2.

Figure 3:
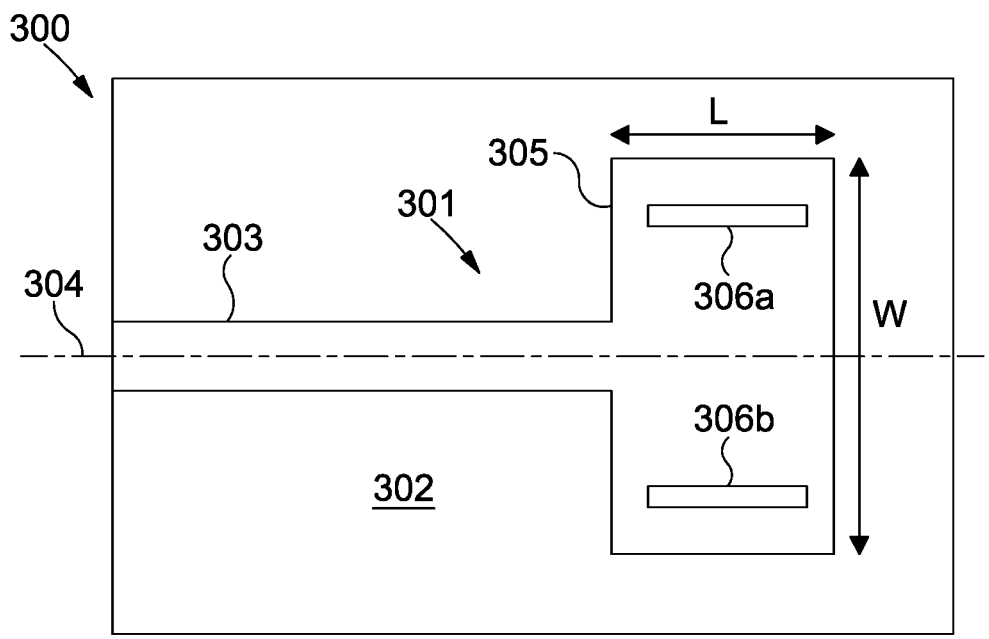
FIG. 3 is a schematic plan view of a patch antenna according to an embodiment.

FIG. 3 is a schematic plan view of an example embodiment of an antenna 300 configured to have two resonant frequencies within a frequency range of operation. The antenna 300 has the same basic structure of the antenna 100 of FIG. 1, i.e. with a rectangular patch antenna 301 on a substrate 302, with a microstrip lead 303 connected to a patch 305, the lead 303 extending along a central axis 304 and the patch 305 extending either side of the axis 303. The dimensions L and W of the patch are the same as those in the specific example provided above. The antenna 300 differs from the antenna 100 of FIG. 1 in that two slots 306a, 306b are provided within the rectangular patch 305 on opposing sides of the axis 304. The slots 306a, 306b result in the patch 305 having two resonant frequencies, one of which is defined by the length L of the patch and the other by the size and position of the slots 306a, 306b. The patch antenna is preferably symmetric about the axis 303. The slots 306a, 306b may be between 0.6 and 0.9 of the length L of the patch antenna 305, and in the example shown are each 0.85 mm in length. The slots 306a, 306b may be positioned such that each slot is between 5% and 20% of the width from the edge of the patch 305, and in the example shown are 0.2 mm from the edges. The slots 306a, 306b may be generally positioned to be equidistant from the edges orthogonal to the central axis 304 and are generally symmetrical about the axis 304. The width of each slot may be generally between 0.05 and 0.3 mm, depending on the overall dimensions of the patch and on manufacturing tolerances.

Figure 4:
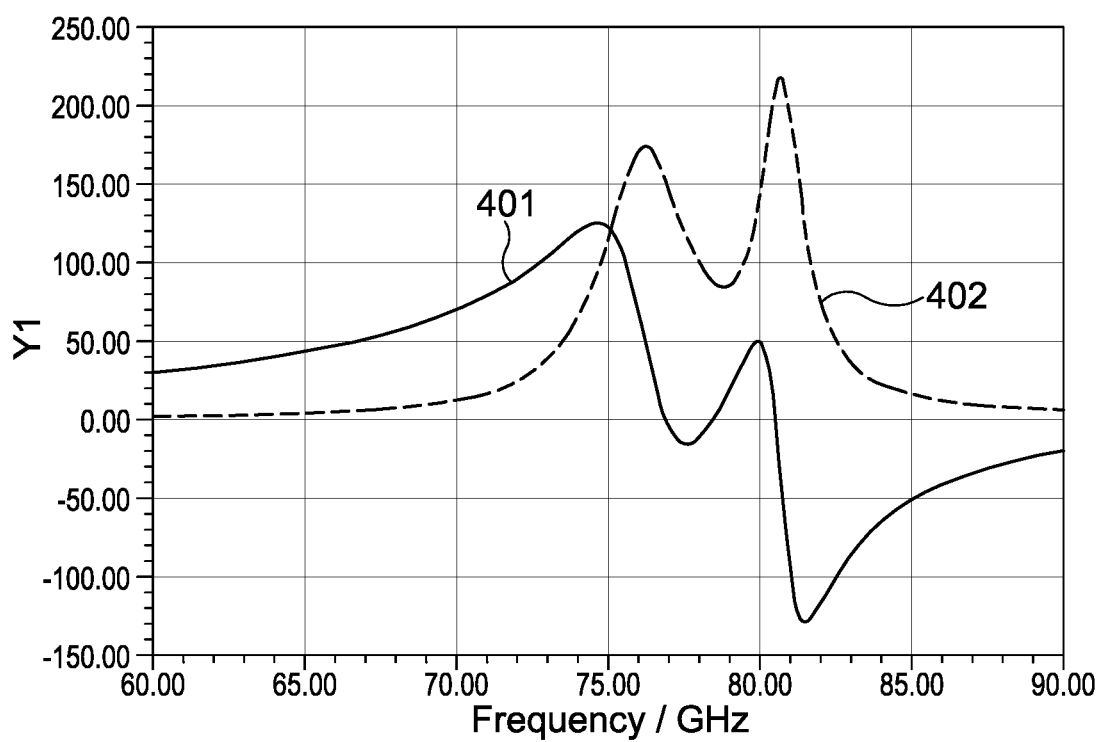
FIG. 4 is a plot of the real and imaginary parts of the antenna impedance as a function of frequency for a patch antenna of the type illustrated in FIG. 3.
Figure 5:
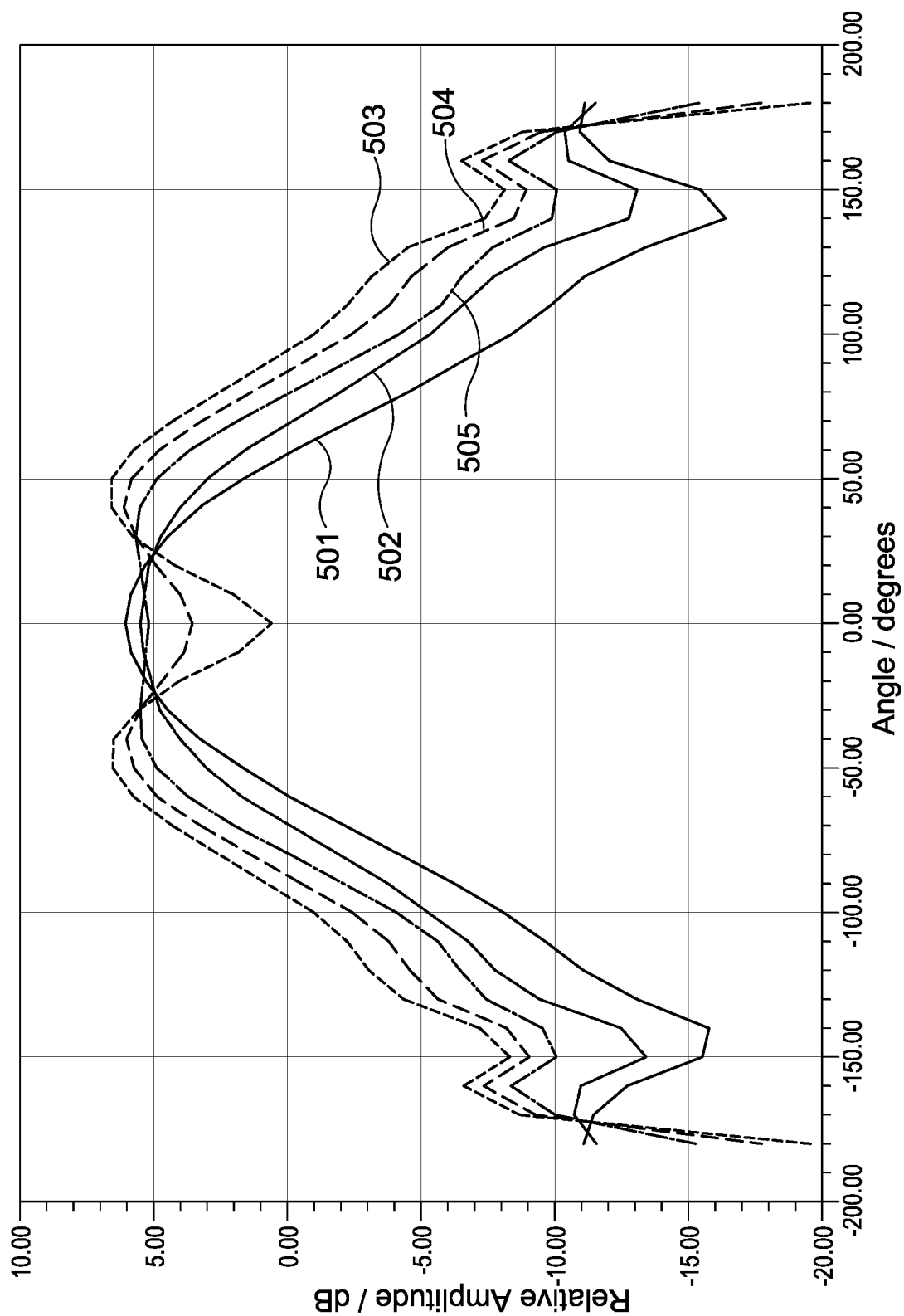
FIG. 5 is a plot of radiation amplitude as a function of angle over a range of frequencies for the patch antenna of the type illustrated in FIG. 3.

A plot of the real 401 and imaginary 402 parts of the port impedance of an antenna of the type shown in FIG. 3 as a function of frequency is shown in FIG. 4. The antenna 300 exhibits two resonant frequencies, in this example at around 76 GHz and 81 GHz. The radiation pattern at the two resonant frequencies is different. This is illustrated in FIG. 5, in which amplitude as a function of angle is plotted for different frequencies. The frequencies chosen for this example are 76, 77, 79, 80 and 81 GHz, covering both of the resonant frequencies exhibited by the antenna. The trace 501 for 76 GHz, which is at the lower of the two resonant frequencies, shows a peak amplitude at zero angle, with the amplitude tailing off in either direction. As the frequency is increased to 77 GHz (trace 502), the peak lowers and the width broadens and then, at 79 GHz (trace 503), transforms into a broader distribution with a double peak and lower amplitude at zero angle. At higher frequencies 80 GHz (trace 504) and 81 GHz (trace 505) the double peak disappears but the distribution remains broader than at 76 GHz.

The difference in radiation distribution at different frequencies can be used to define a narrow field of view at one frequency, such as at 77 GHz in the example in FIG. 5, and a broader field of view at another frequency, for example using one of the higher frequencies. The amplitude difference at higher angles can be substantial, providing up to around 8 dB difference at a 100 degree angle (i.e. the difference between the amplitudes of traces 503 and 501 at 100 degrees in FIG. 5). An application of this is in automotive radar sensing applications, where a narrow field of view is needed for sensing objects immediately in front of the vehicle, such as the vehicle in front, and a wider field of view for sensing objects in the surroundings, such as other vehicles and pedestrians on either side of the vehicle. Allowing for both fields of view to be possible with a single antenna reduces the amount of hardware required, and allows the field of view to be switched simply by switching the operating frequency of the antenna.

Figure 6:
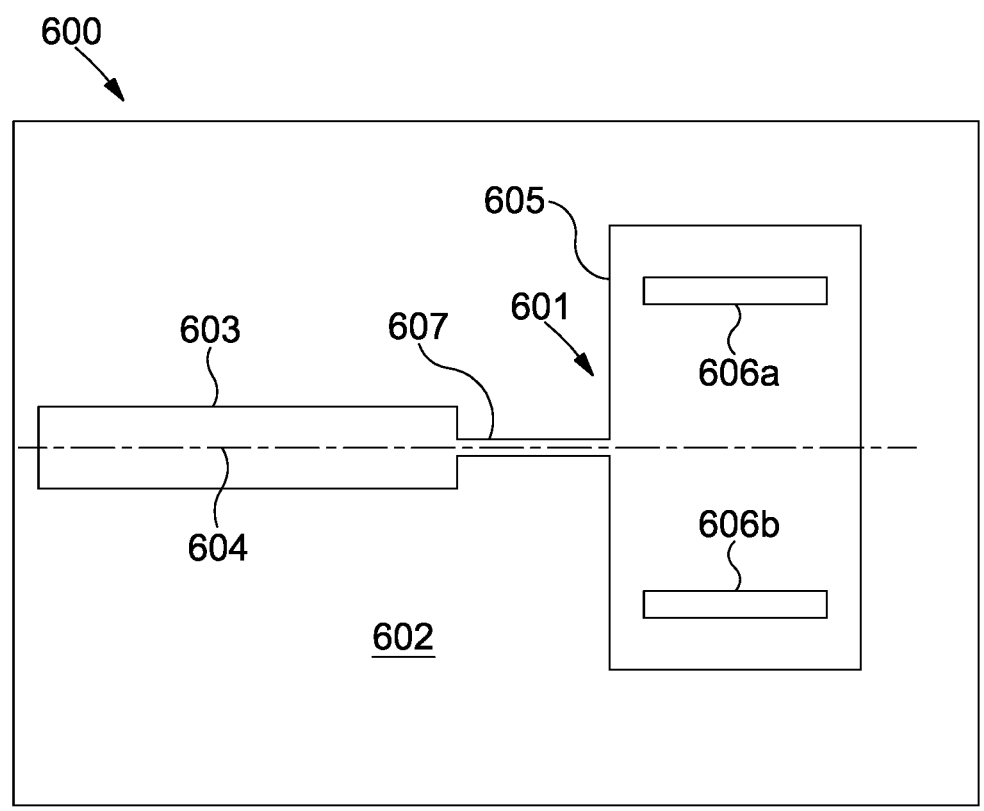
FIG. 6 is a schematic plan view of an alternative example patch antenna.

FIG. 6 is a schematic plan view of an example antenna 600 comprising a patch antenna 601 of similar form to the antenna 300 of FIG. 3, the main difference being a narrowed region 607 of the microstrip lead 603 leading to the patch antenna 601. The narrowed region is an example of an impedance matching network for the antenna 601. A matching network may be provided in other forms. The antenna 600 is otherwise of the same form as the antenna 300 of FIG. 3, with two slots 606a, 606b on either side of a central axis 604, the patch antenna 601 and microstrip lead 603 being formed on a dielectric substrate 602 having a ground plane (not shown) on an opposing face.

Figure 7:
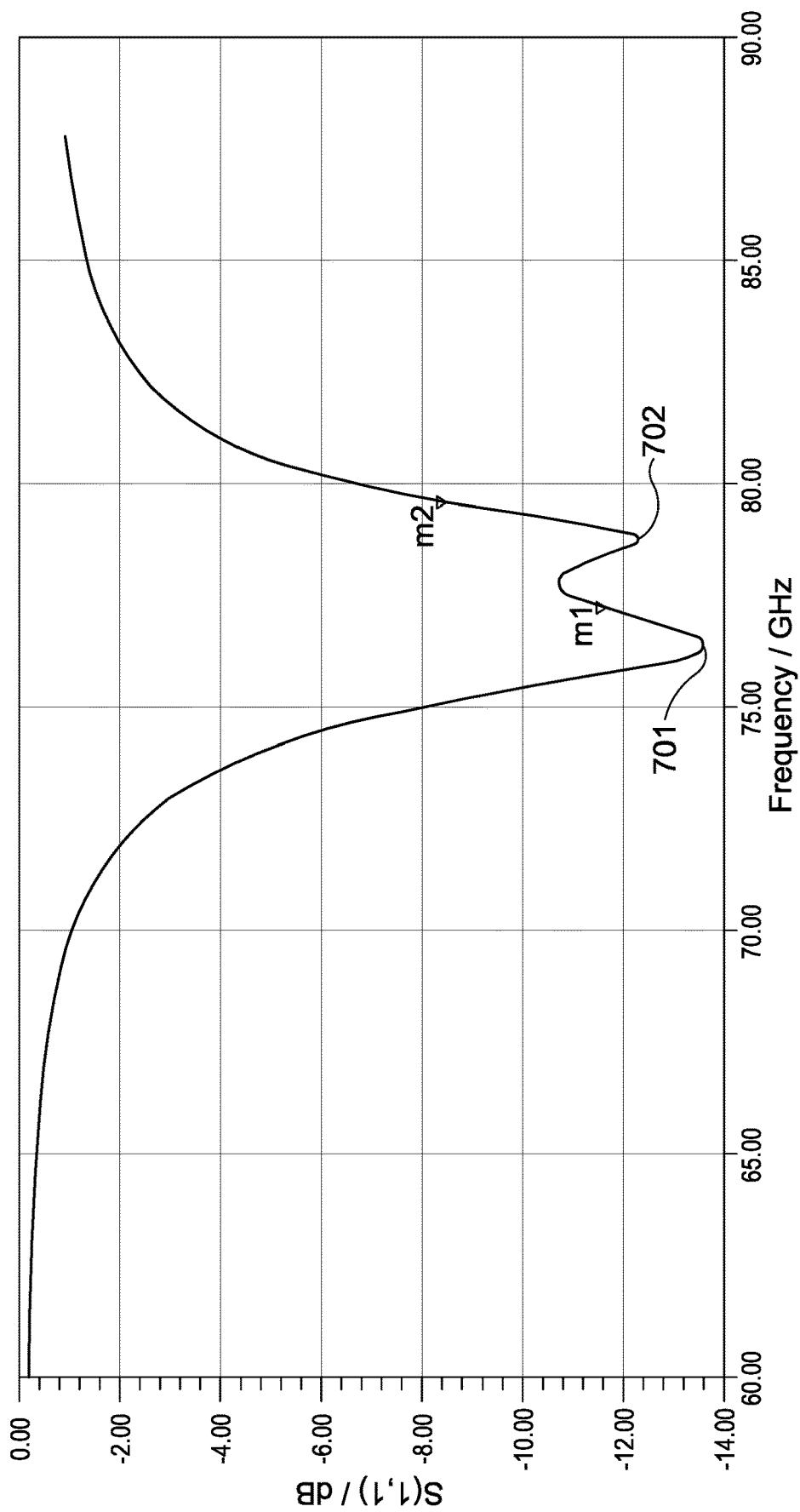
FIG. 7 is a plot of the magnitude of the S(1,1) parameter of the antenna of FIG. 6 as a function of frequency.
Figure 8:
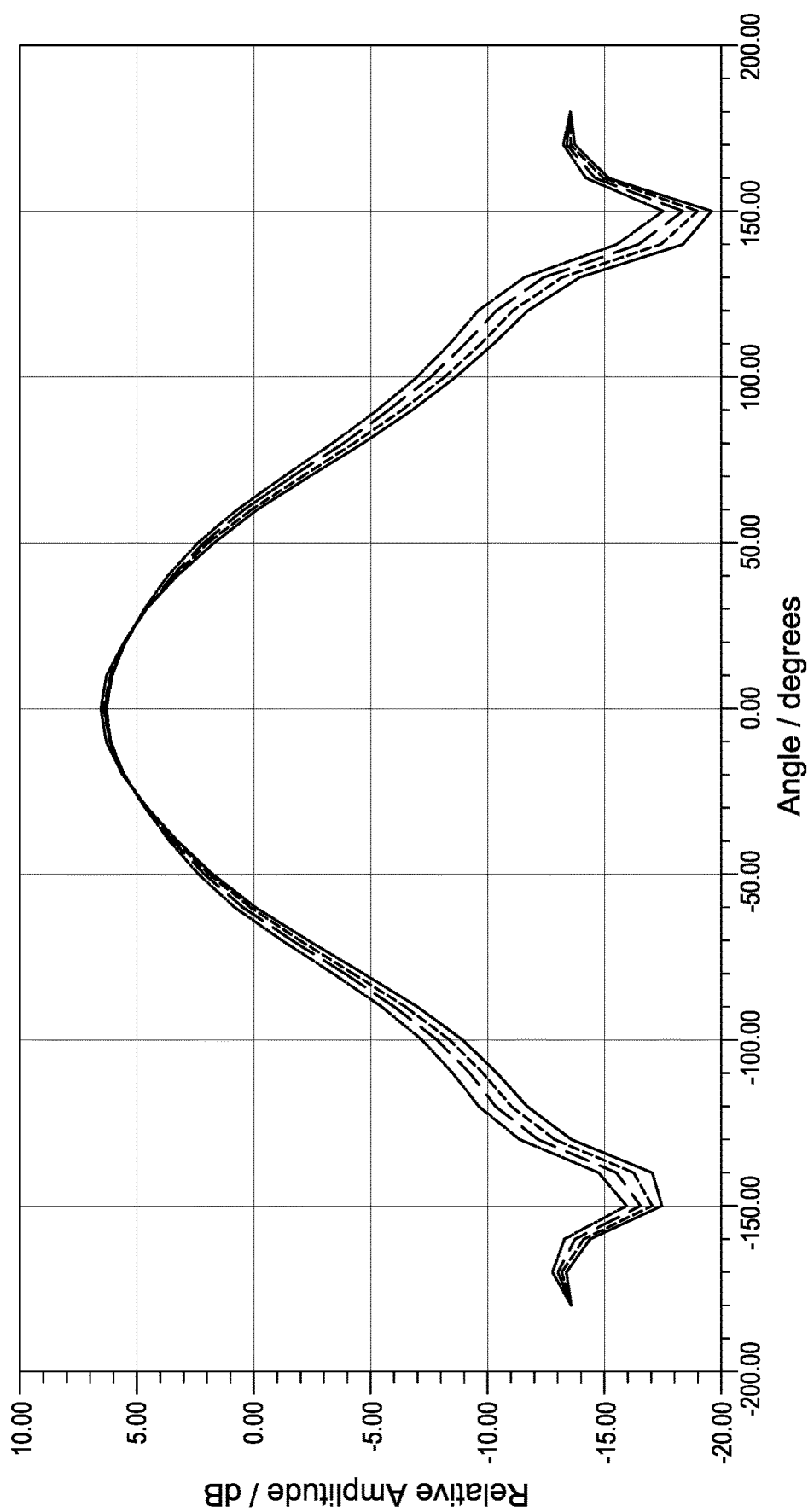
FIG. 8 is a plot of radiation amplitude as a function of angle over a range of frequencies around a first resonant frequency for the patch antenna of the type illustrated in FIG. 6.
Figure 9:
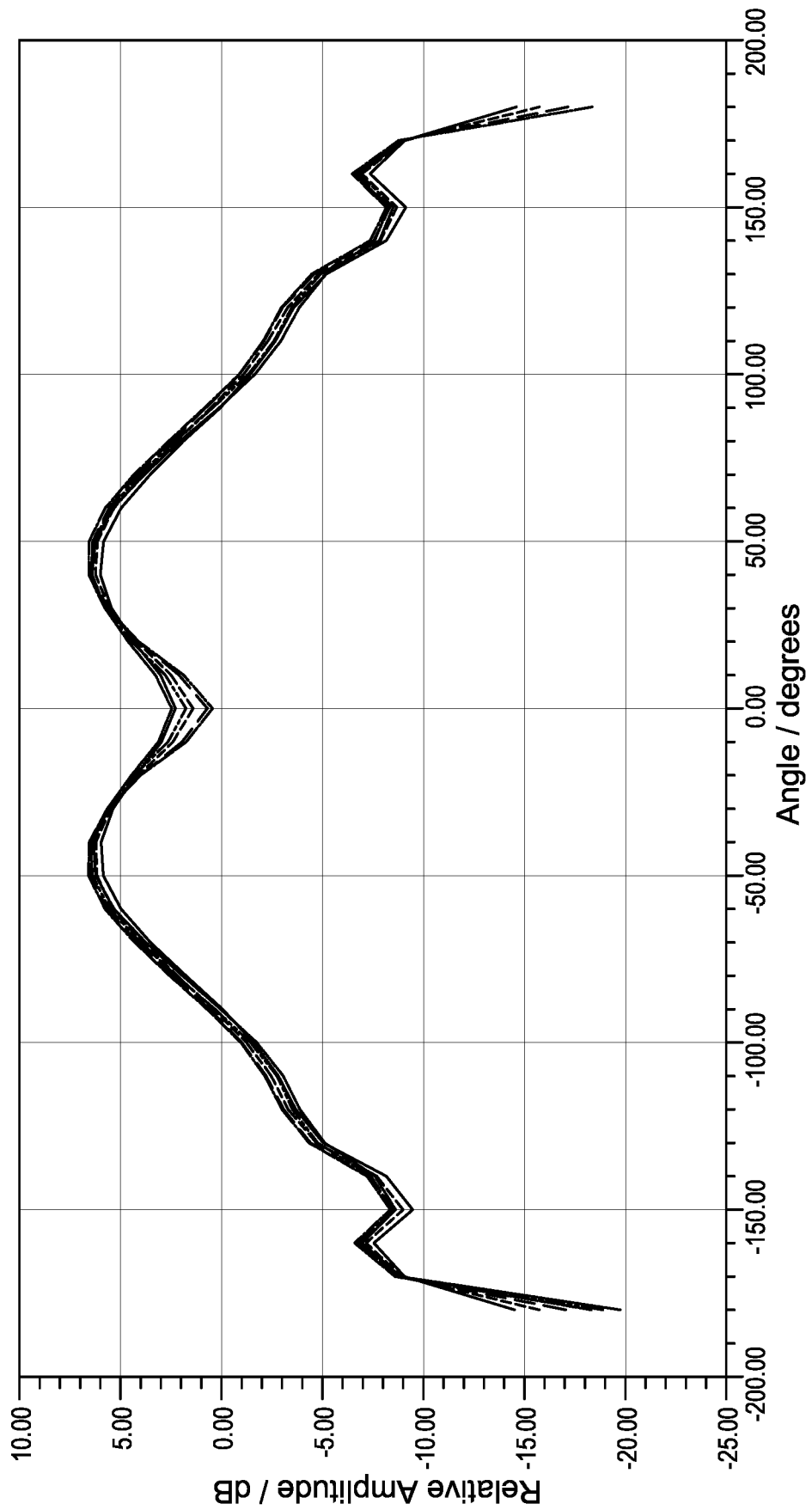
FIG. 9 is a plot of radiation amplitude as a function of angle over a range of frequencies around a second resonant frequency for the patch antenna of the type illustrated in FIG. 6.

FIG. 7 shows a plot of the magnitude of the S(1,1) parameter of the antenna of FIG. 6 as a function of frequency, in which a first resonant frequency 701 at around 76.5 GHz and a second resonant frequency 702 at around 79 GHz are shown. FIGS. 8 and 9 illustrate further plots of amplitude as a function of angle for two different narrower frequency ranges for the same antenna. FIG. 8 shows the variation in radiation pattern for frequencies ranging from 76 to 76.6 GHz (four traces covering a bandwidth of 0.6 GHz), while FIG. 9 shows the variation in radiation pattern for frequencies ranging from 78.2 to 79.6 GHz (8 traces covering a bandwidth of 1.2 GHz). The overall shape of the radiation pattern is distinctly different for the two frequency ranges, with the lower range having a narrower distribution with a single peak at zero angle, while the higher range has a broader distribution with peaks at around +/−45 degrees.

In a general aspect therefore, the antenna may be configured such that a radiation pattern of the antenna at a first one of the resonant frequencies has a peak at zero azimuth angle, and a radiation pattern of the antenna at a second one of the resonant frequencies has two peaks on either side of the zero azimuth angle. In certain embodiments the two peaks may be at between +/−30 to 60 degrees, and may be between +/−40 to 50 degrees. Having peaks in the radiation pattern on either side of the zero azimuth angle broadens out the radiation pattern, thereby allowing the second resonant frequency to be used to measuring at wide angles, while the first resonant frequency can be used for measuring at narrower angles. The antenna thereby serves two purpose simply by changing the frequency of operation.

Figure 10:
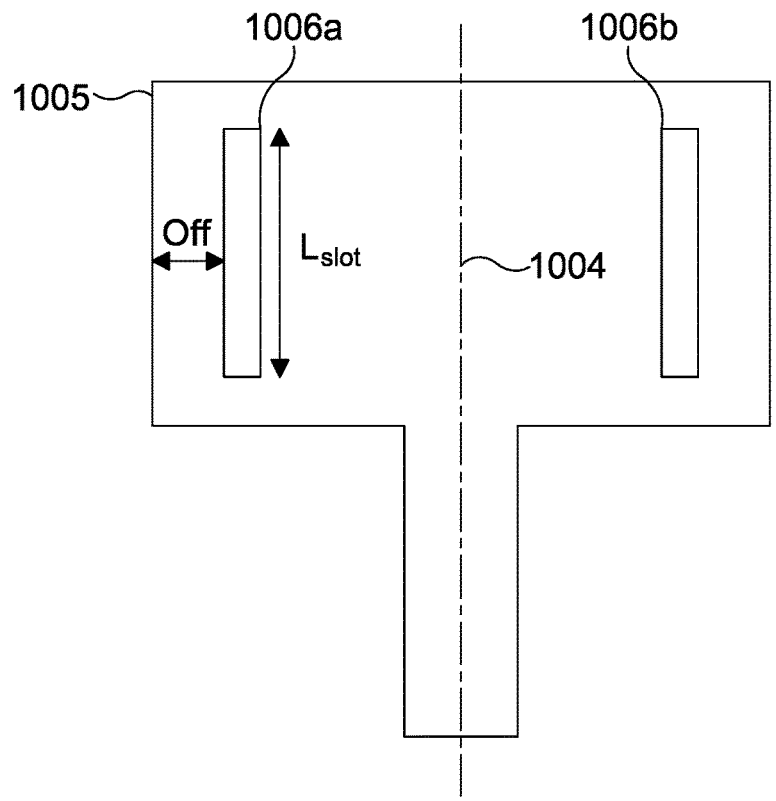
FIG. 10 is a schematic plan view of an alternative example patch antenna.
Figure 11:
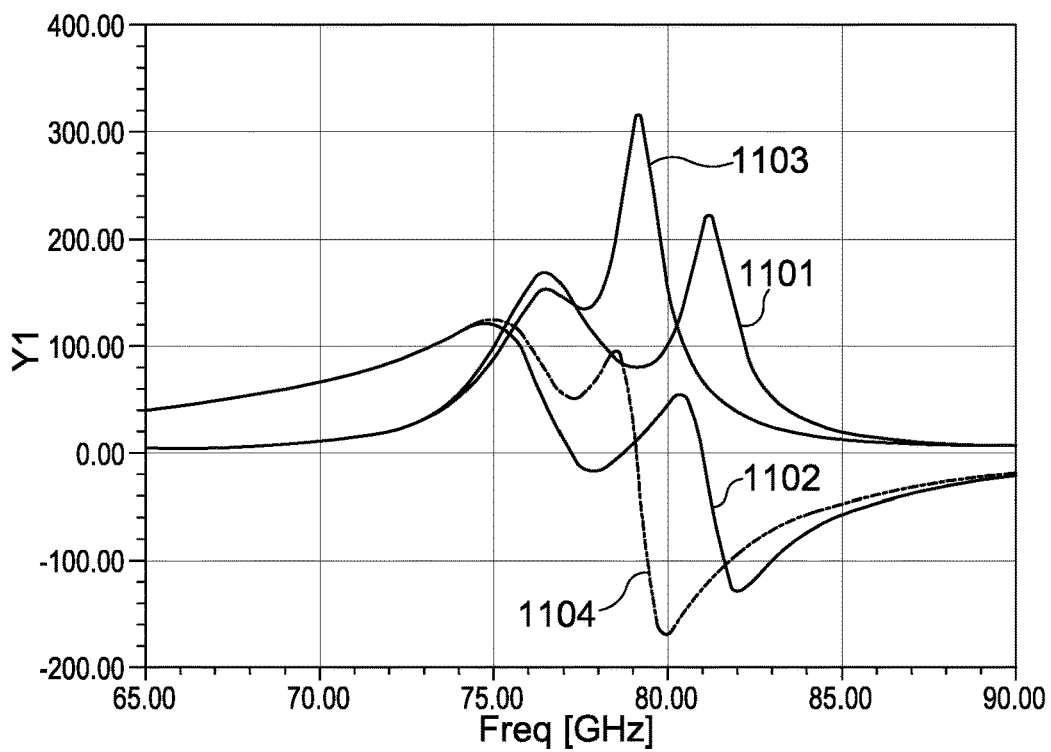
FIG. 11 is a plot of the real and imaginary parts of the Z(1,1) parameter of the patch antenna of FIG. 10, with two different slot length values.
Figure 12:
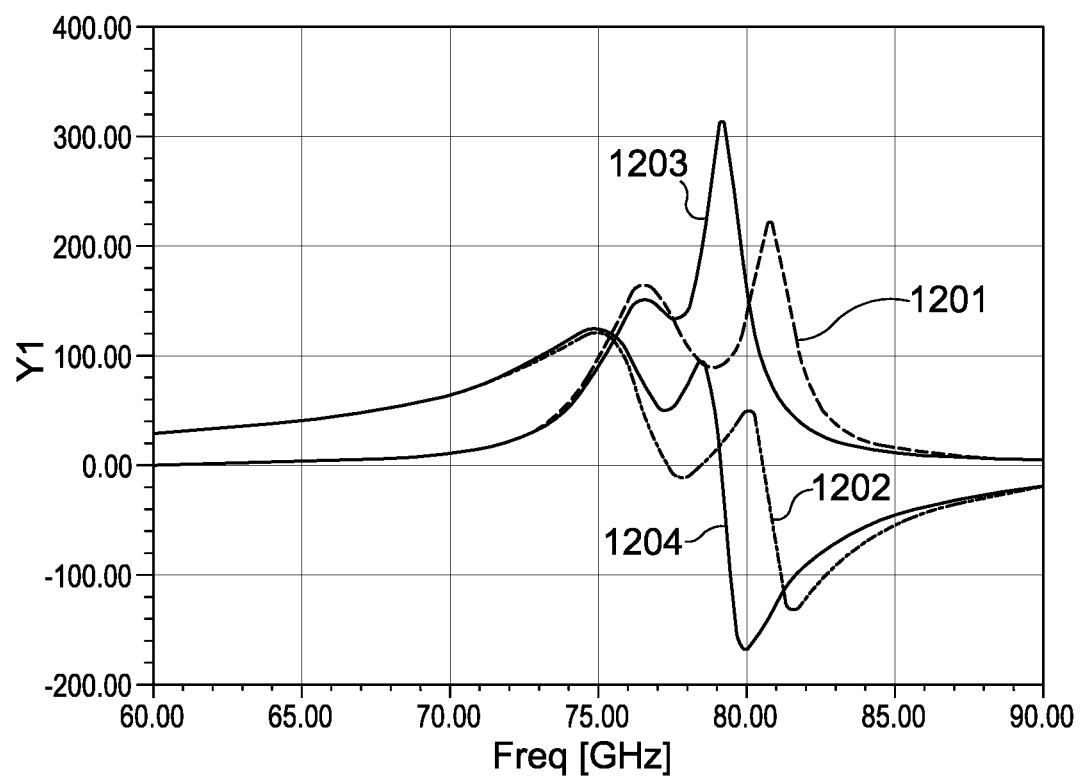
FIG. 12 is a plot of the real and imaginary parts of the Z(1,1) parameter of the patch antenna of FIG. 10, with two different values of an offset of the slots from an edge of the antenna.

FIG. 10 shows a schematic plan view of an example patch antenna structure 1005, in which the length and position of the slots 1006a, 1006b are indicated. Each slot has a length $L_{slot}$ along the direction of the central axis of symmetry 1004 and an offset Off from the edge of the patch antenna 1005. FIGS. 11 and 12 are plots of real and imaginary parts of the Z(1,1) parameter of the patch antenna 1005 as a function of frequency for two values of $L_{slot}$ (FIG. 11) and for two values of Off (FIG. 12), illustrating the effect of changing these dimensions on the resonant frequencies. In FIG. 11, plots 1101, 1102 for Lslot=0.65 mm and plots 1103, 1104 for Lslot=0.7 mm are shown for the real and imaginary parts respectively (keeping Off constant at 0.2 mm), which indicates the sensitivity of the relative strength and position of the resonant peaks to the length of the slots. In FIG. 12, plots 1201, 1202 for Off=0.15 mm and plots 1203, 1204 for Off=0.2 mm are shown for the real and imaginary parts respectively (keeping $L_{slot}$ at 0.7 mm), indicating the sensitivity of the relative strength and position of the resonant peaks to the distance of the slots from the edge of the patch.

Figure 13:
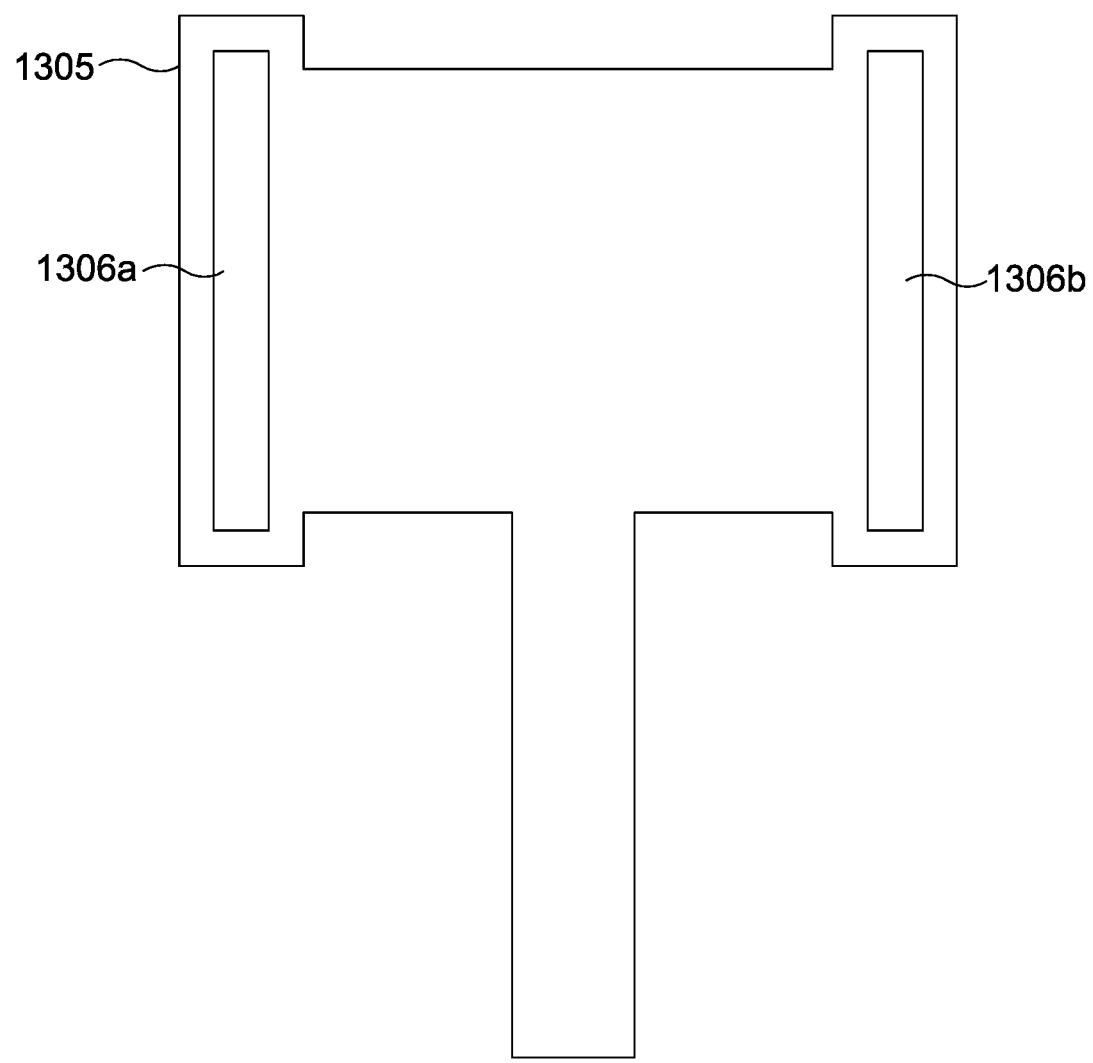
FIG. 13 is a schematic plan view of an alternative configuration of a patch antenna structure.

FIG. 13 illustrates an alternative configuration of patch antenna structure 1305, in which slots 1306a, 1306b are provided within loops extending outside an inner region of the patch antenna. The patch antenna structure 1305 is otherwise of similar general form as in the other illustrated embodiments.

From reading the present disclosure, other variations and modifications will be apparent to the skilled person. Such variations and modifications may involve equivalent and other features which are already known in the art of patch antenna design, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

What is claimed is:

1. An antenna comprising:
a substrate;
a ground plane on a first face of the substrate;
an impedance matching network comprised of a microstrip lead on an opposing second face of the substrate, wherein the microstrip lead extends along a central axis, and the microstrip lead includes a first region of a first width and a second region of a second width that is narrower than the first width; and
a patch antenna on an opposing second face of the substrate, the patch antenna coupled to the second region of the microstrip lead, and the patch antenna including a rectangular radiating element having a length parallel to the central axis and a width perpendicular to the central axis, wherein the width is significantly greater than the length, and having two slots separated from each other on opposing sides of the central axis such that the patch antenna has two resonant frequencies within an operating frequency range of the patch antenna, each slot being defined by a continuous perimeter that is offset from the continuous perimeter of the other slot, each slot being offset in a direction of the length from respective edges of the rectangular radiating element that define the width and offset in a direction of the width from respective edges of the rectangular radiating element that define the length, wherein the two slots are oriented parallel to the central axis, and wherein the antenna is configured to provide, via the offset positioning of the respective slots, a first radiation pattern of the antenna at a first one of the resonant frequencies that is distinct from, as being narrower than, a second radiation pattern of the antenna at a second one of the resonant frequencies.

2. The antenna of claim 1, wherein the two resonant frequencies are within a frequency range of 60 to 90 GHz.

3. The antenna of claim 2, wherein the two resonant frequencies are within a frequency range of 75 to 80 GHz.

4. The antenna of claim 1, wherein a higher one of the two resonant frequencies is less than 5% greater than a lower one of the two resonant frequencies, and wherein the two resonant frequencies of the patch antenna are configured to permit the patch antenna to sense objects via a narrow field of view and via a broader field of view.

5. The antenna of claim 4, wherein a ratio between the higher and lower resonant frequencies is between 1.01 and 1.05.

6. The antenna of claim 1, wherein each of the two slots is positioned between 5% and 20% of a width of the rectangular radiating element from an edge thereof, and wherein the two resonant frequencies of the patch antenna are configured to permit the patch antenna to sense objects via a narrow field of view and via a broader field of view.

7. The antenna of claim 1, wherein a width of each of the two slots is between 0.05 and 0.3 mm, and wherein a length of each of the two slots is between 0.6 and 0.9 of a length of the rectangular radiating element.

8. The antenna of claim 1 being configured and arranged for use with a radio frequency communications transceiver to operate with the antenna:

in a first mode for sensing objects at short distances by operating the antenna at a lower one of the resonant frequencies to provide a narrow field of view; and in a second mode for sensing objects at far distances by operating the antenna at a higher one of the resonant frequencies to provide a wide field of view.

9. The antenna of claim 1, wherein the two resonant frequencies are within a frequency range from 60 GHz to 110 GHz, and the frequency range is for radar sensing, and wherein the antenna is configured to obtain a first radiation pattern of the antenna at a first one of the resonant frequencies and to obtain a second radiation pattern of the antenna at a second one of the resonant frequencies, wherein the first radiation pattern corresponds to a first field of view and the second radiation pattern corresponds to a second field of view that is wider than the first field of view.

10. An antenna comprising:
a substrate;
a ground plane on a first face of the substrate;
an impedance matching network comprised of a microstrip lead on an opposing second face of the substrate, wherein the microstrip lead extends along a central axis, and the microstrip lead includes a first region of a first width and a second region of a second width that is narrower than the first width; and
a patch antenna on an opposing second face of the substrate, the patch antenna coupled to the second region of the microstrip lead, and the patch antenna including a rectangular radiating element, the rectangular radiating element having a length parallel to the central axis and a width perpendicular to the central axis, wherein the width is significantly greater than the length, and having two slots separated from each other on opposing sides of the central axis such that the patch antenna has two resonant frequencies within an operating frequency range of the patch antenna, each slot being defined by a continuous perimeter that is offset from the continuous perimeter of the other slot, each slot being offset in a direction of the length from respective edges of the rectangular radiating element that define the width and offset in a direction of the width from respective edges of the rectangular radiating element that define the length, wherein the antenna is configured to obtain a first radiation pattern of the antenna at a first one of the resonant frequencies that has a peak at zero azimuth angle, and to obtain a second radiation pattern of the antenna at a second one of the resonant frequencies that has two peaks on either side of the zero azimuth angle.

11. The antenna of claim 10, wherein the two peaks are at an angle of between +/−30 to 60 degrees.

12. The antenna of claim 10, wherein the two resonant frequencies are within a frequency range from 60 GHz to 110 GHz, and the frequency range is for radar sensing, and wherein the first radiation pattern corresponds to a first field of view and the second radiation pattern corresponds to a second field of view that is wider than the first field of view.

13. An apparatus comprising:
a substrate;
a ground plane on a first face of the substrate;
an impedance matching network comprised of a microstrip lead on an opposing second face of the substrate, wherein the microstrip lead extends along a central axis, and the microstrip lead includes a first region of a first width and a second region of a second width that is narrower than the first width; and
a patch antenna on a second face of the substrate that opposes the first face, the patch antenna coupled to the second region of the microstrip lead, and the patch antenna including a rectangular radiating element having a length extending along a central axis and having a width perpendicular to the central axis, wherein the width is significantly greater than the length, the radiating element characterized as being shaped rectangularly by two opposing length edges and two opposing width edges and by four right angles meeting the edges and being connected to the lead and having slots defined by separate continuous perimeters that are located on opposing sides of the central axis and that are positioned such that each of the slots is positioned not less than 5% from the edges of the rectangular radiating element, wherein the patch antenna is configured with the ground plane and substrate to
operate in a first mode for narrow-field communications at a first resonant frequency, and
operate in a second mode for broad-field communications at a second resonant frequency that is different than the first resonant frequency.

14. The apparatus of claim 13, wherein the patch antenna is configured and arranged with the ground plane and substrate to generate a first radiation pattern in the first mode and to generate a second radiation pattern in the second mode, the first and second radiation patterns being different.

15. The apparatus of claim 14, wherein the first radiation pattern defines a first field of view immediately adjacent the patch antenna, and the second radiation pattern defines a second field of view that is wider and extends further from the patch antenna relative to the first field of view.

16. The apparatus of claim 13, wherein the first and second resonant frequencies are within a frequency range from 60 GHz to 110 GHz, and the frequency range is designated for radar sensing, and wherein the antenna is configured to obtain a first radiation pattern of the antenna at a first one of the resonant frequencies and to obtain a second radiation pattern of the antenna at a second one of the resonant frequencies.

17. The apparatus of claim 13, wherein each of the slots is elongated in an elongation direction of the central axis and is positioned symmetrically on either side of the central axis to be offset, along the elongation direction, from a nearest one of the edges by not less than 5% of the width of the rectangular radiating element.

18. The apparatus of claim 13, wherein each of the two slots is positioned between 5% and 20% of the width of the rectangular radiating element from a nearest one of the edges characterizing the length of the rectangular radiating element.

19. The apparatus of claim 18, wherein a ratio between the higher and lower resonant frequencies is between 1.01 and 1.05.

20. The apparatus of claim 18, wherein a higher one of the two resonant frequencies is less than 5% greater than a lower one of the two resonant frequencies.

* * * * *